W. G. CHIPLEY.
FELLY AND TREAD CONSTRUCTION FOR WHEELS.
APPLICATION FILED JUNE 17, 1918.
1,315,092.
Patented Sept. 2, 1919.
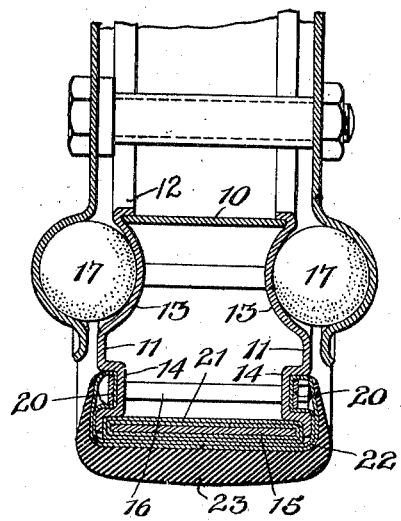
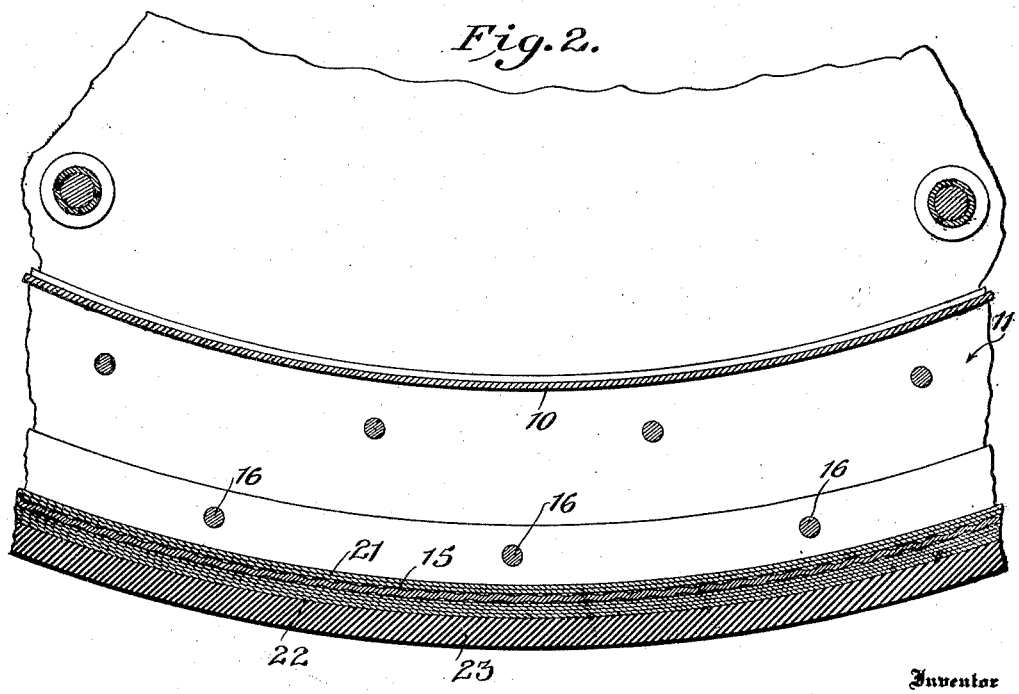
Inventor
William G. Chipley

UNITED STATES PATENT OFFICE.

WILLIAM G. CHIPLEY, OF OMAHA, NEBRASKA.

FELLY AND TREAD CONSTRUCTION FOR WHEELS.

1,315,092. Specification of Letters Patent. Patented Sept. 2, 1919.

Application filed June 17, 1918. Serial No. 240,535.

*To all whom it may concern:*

Be it known that I, WILLIAM G. CHIPLEY, a citizen of the United States, residing at Omaha, in the county of Douglas and State of Nebraska, have invented certain new and useful Improvements in Felly and Tread Constructions for Wheels; and I do hereby declare the following to be a full, clear, and exact description of the invention, such as will enable others skilled in the art to which it appertains to make and use the same.

This invention relates to improvements in vehicle wheels, and more especially to an improvement in and the manufacture of rims and noise-deadening treads or tires for wheels.

It is one of the objects of the present invention to provide a rim structure which is of such design as to be relatively light, durable, of great strength, and which may be readily provided with a noise-deadening tire or tread band.

Another object of the invention is to provide an improved tread band for wheels, which band is of such construction and method of manufacture that it may be built up as a substantially rigid part of the rim and which may be readily renewed to replace wear and damage as incident to the use of the wheel.

With the above and other objects in view as will be rendered manifest to those versed in the art, the invention consists in the construction, the combination, and in details and arrangements of the parts as more fully hereinafter described relative to the embodiments of the invention shown in the accompanying drawings, in which Figure 1 is a transverse radial section through the tire as arranged in combination with a resilient wheel structure;

Fig. 2 is a central longitudinal section through the form of wheel illustrated in Fig. 1.

The present invention has for its object the provision as above stated of a novel, practicable and comparatively inexpensive noiseless cushioning tread for vehicle wheels, and in the form of the invention illustrated in Figs. 1 and 2, the rim comprises an annular rim band 10 of suitable diameter over which is applied to the side edges flat rings or side members 11—11 which are provided with seats 12 at their radial inner edges to embrace the edges of the band 10, these side members 11—11 being provided in the present embodiment with series of concaved seats 13 to receive cushioning balls 17 upon which are pressed the adjacent annular portions of a central wheel structure. The side plates 13—13 are shown as rabbeted at 14 adjacent their outer portions and between the extreme outer edges or lips of the plates or members 11 there is interposed a tire receiving band 15 upon which the tread or tire is adapted to be built.

In Figs. 1 and 2 the annular tire or tread member 15 is first covered with a binding 21 of a suitable fabric material, and after being placed between the outer lips of the side or clamping plates 11 is then overlapped or wrapped with a wrapping 22 of fabric or other suitable material which is carried into the recesses 14 when the side members may be clamped together upon the interposed band 15 by suitable fastening means, such as bolts 16, the heads of which at one end and the nuts at the other depress the layer of the wrapping 22 and draw the same into the rabbet. Preferably the layers of the wrapping in the rabbets are overlapped by flat hoops 20 through which the bolts are passed, these hoops acting to uniformly draw the fabric wrapping 22 firmly down into the seat or rabbet 14—14 of each plate after which the marginal portions of the winding or wrapping are taken back over the peripheral face of the windings on the member 15. Then a layer or layers in suitable quantity of rubber or other appropriate material 23 are vulcanized or otherwise securely joined to the body of winding and wrapping about the band 15, it being obvious that the wrappings and windings afford the efficient attachment of the rubber tread portion 23 to the rim structure.

When the wrapping 22 and the winding 21 are of fabric material they may be impregnated with rubber or any cementitious agent to facilitate the joining or attachment of the rubber or other material forming the tread wrapping, so that the wrapping, the winding and the tread become intimately interbound.

What is claimed is:

1. In a wheel, a rim structure comprising annular side lips internally shouldered; a tread ring between said lips and bearing upon the shoulders thereof, said ring having a winding fabric; a fabric wrapper vulcanized to the winding and having a tread band, and means for securing the wrapper to the rim.

2. In a wheel, a rim structure comprising annular side lips internally shouldered; a tread ring between said lips and bearing upon the shoulders thereof, said ring having a vulcanizable facing; a fabric wrapper vulcanized to the facing and having a tread band, and means for securing the ring between and through the lips.

3. In a wheel, a rim structure comprising side plates each having an annular shallow rabbet in its lateral face; a tread ring between the plates and beyond the outer shoulder of the rabbets; a vulcanizable fabric facing on the said ring; a fabric wrapper overlying the outer sides of the rabbets and the facing and vulcanized thereto, and means for securing the wrapping to the rim.

4. In a wheel, a rim structure comprising side plates each having an annular shallow rabbet in its outer lateral face and an inner annular shoulder; a metallic tread ring between the plates and seated upon the shoulder of the rabbets; fabric windings around the said ring; a fabric wrapper overlying the outer sides of the rabbets and the face of the winding and vulcanized thereto, and means for securing the wrapping to the rim, and for connecting the side plates, and clamping them to the ring.

5. In a wheel, a rim structure comprising side plates each having an annular shallow rabbet in its lateral face; a tread ring between the plates and beyond the outer shoulder of the rabbets; fabric windings around the said ring and bearing against the plates; a fabric wrapper having return bights overlying the outer sides of the rabbets and the face of the winding and vulcanized thereto, and means for securing the wrapping to the rim, said means including hoops arranged in the bights of the wrapping, laid in the rabbets of the plates, and secured to the plates.

6. In a wheel, a rim structure comprising side plates each having an annular shallow rabbet in its outer lateral face and an inner annular shoulder; a substantially immovable tread ring between the plates and beyond the shoulders; fabric windings around the said ring and bearing against the plates; a fabric wrapper overlying the outer sides of the rabbets and the face of the winding and vulcanized thereto, means for securing the wrapping to the rim, said means including hoops arranged in bights of the wrapping, laid in the rabbets of the plates, and secured to the plates by bolts passing through and connecting the plates, and a tread band vulcanized around the wrapper and the bights of the sides thereof covering the said securing means.

In testimony whereof I affix my signature.

WILLIAM G. CHIPLEY.

Copies of this patent may be obtained for five cents each, by addressing the "Commissioner of Patents, Washington, D. C."